Oct. 10, 1950 L. C. STENNING 2,525,151

WAVE-SIGNAL RECEIVER

Filed Dec. 10, 1945

INVENTOR:
LUIS C. STENNING,
BY Harry C. Page
ATTORNEY.

Patented Oct. 10, 1950 2,525,151

UNITED STATES PATENT OFFICE 2,525,151

WAVE-SIGNAL RECEIVER

Luis C. Stenning, Wembley, England, assignor, by mesne assignments, to Hazeltine Research, Inc., Chicago, Ill., a corporation of Illinois Application December 10, 1945, Serial No. 634,011
In Great Britain February 21, 1945

9 Claims. (Cl. 250—20)

Figure 1:
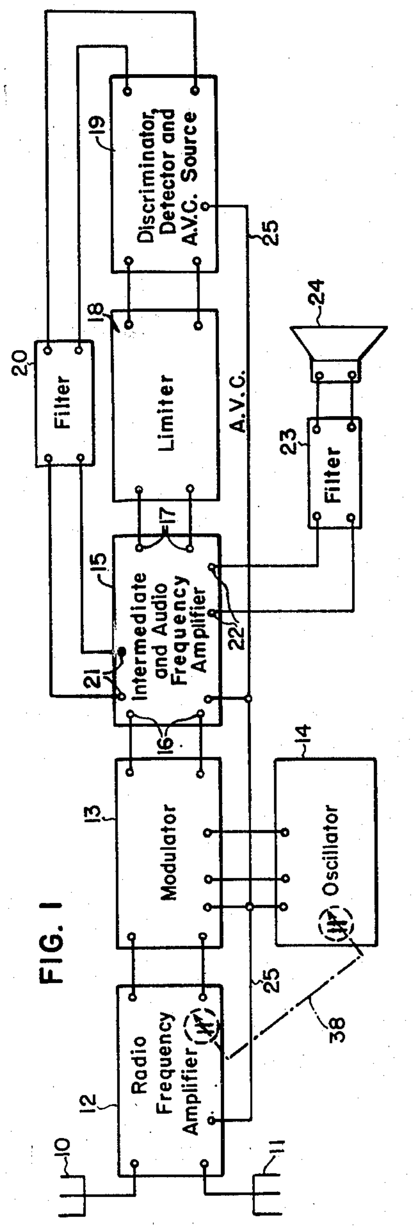

This invention relates, in general, to wave-signal receivers for translating modulated carrier-wave signals having desired angular-velocity modulation components. It is specifically directed to receiving systems of the "reflex" type which comprise an amplifier, a frequency converter coupled in cascade to the amplifier and a feed-back or reflex path extending from the output circuit of the frequency converter to the input circuit of the amplifier. In such a system, a received signal is amplified in the amplifier, converted to a new frequency range in the frequency converter and fed back to the amplifier for additional amplification. Receivers of the type under consideration exhibit high gain and, by virtue of the reflex feature, effect an economy in the number of stages required to realize a desired over-all amplification.

The invention may be employed in translating carrier-wave signals which are either phase or frequency modulated. Accordingly, as used in this specification and in the appended claims, the term "modulated carrier-wave signals having desired angular-velocity modulation components" and like expressions are intended to define phase or frequency-modulated carrier signals. It may be shown that such signals, at least theoretically, include an infinite number of modulation components distributed throughout the frequency spectrum. However, for most applications, the translated intelligence may be derived in a receiver which is capable of accommodating a limited number of the components of modulation. This number is selected by the pass-band characteristics of the receiver and is designated, for convenience, as the desired modulation components of the modulated carrier-wave signal.

One prior reflex receiver for translating angular-velocity modulated signals comprises a radio-frequency amplifier, a heterodyning oscillator-modulator for converting radio-frequency signals to intermediate-frequency signals and a feed-back or reflex path between the output circuit of the oscillator-modulator and the amplifier. While such arrangements have the inherent advantages of reflexing, they are subject to an operating limitation which may be undesirable in particular installations. For example, the angular-velocity modulated signal is received in some installations with an undesired, superposed ampliture modulation. For such operating conditions, both the received signal and the reflexed signal have spurious amplitude-modulation components which may have a tendency to produce objectionable intermodulation or even oscillation in the radio-frequency amplifier.

It is an object of the present invention, therefore, to provide an improved wave-signal receiver which minimizes the above-mentioned limitation of the prior arrangements.

It is a further object of the invention to provide an improved wave-signal receiver of the reflex type for translating angular-velocity modulated wave signals.

In accordance with the invention, a wave-signal receiver for translating modulated carrier-wave signals having desired angular-velocity modulation components included within a first range of frequencies comprises means including at least one input circuit and at least one output circuit for amplifying wave signals within this first range and also wave signals within a second range, exclusive of the first range. An amplitude-limiting means is coupled in cascade with and follows the amplifying means for deleting amplitude modulation from wave signals within the first range. A frequency converter is coupled in cascade with and follows the amplitude-limiting means and is provided to convert the frequencies of the amplitude-limited wave signals within the first range to corresponding frequencies within the second range. The receiver has means for feeding back the output signal of the frequency converter to an input circuit of the amplifying means, and a means is coupled to an output circuit of the amplifying means for supplying wave signals, having frequencies within the second range, to a utilizing device.

Also in accordance with the invention, a wave-signal receiver for translating modulated carrier-wave signals having desired angular-velocity modulation components included within a first range of frequencies, wherein the aforesaid wave signals are subject to undesired amplitude modulation producing corresponding amplitude modulation signals within a second frequency range, comprises means including at least one input circuit and at least one output circuit for amplifying the wave signals within the first range and signals within the second frequency range. The receiver also includes a frequency-conversion system coupled to the output of the amplifying means and having substantial response to frequency deviations of amplified wave signals within the first range yet being substantially independent of the aforesaid undesired amplitude modulation over at least a substantial portion of the second range for converting the frequencies of the amplified wave signals within the first range to corresponding frequencies within the second range. The wave-signal receiver further includes means for feeding back the output signal of the frequency-conversion system to an input circuit of the amplifying means and also means coupled to an output circuit of the amplifying means for supplying signals having frequencies within the second range to a utilizing device.

For a better understanding of the present invention, together with other and further objects thereof, reference is had to the following description taken in connection with the accompanying drawing, and its scope will be pointed out in the appended claims.

Figure 2:
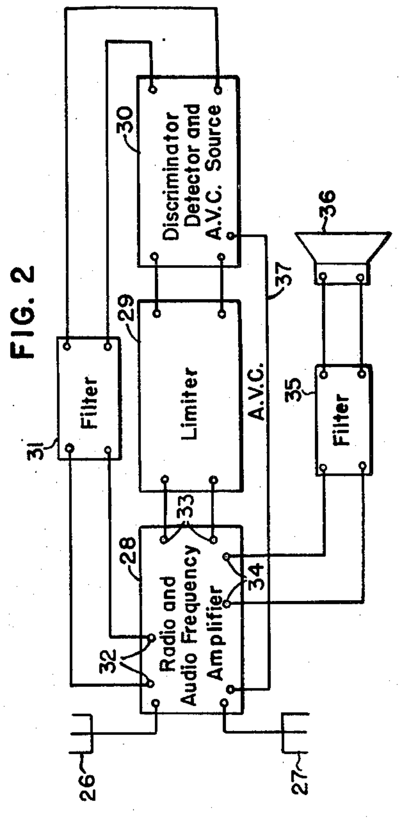

In the drawing, Fig. 1 is a schematic circuit diagram of a complete superheterodyne receiver, and Fig. 2 is a schematic circuit diagram of a tuned radio-frequency receiver, each of which embodies the present invention.

Referring now more particularly to Fig. 1, there is represented a wave-signal receiver for translating modulated carrier-wave signals having desired angular-velocity modulation components included within a first range of frequencies. The initial stages are similar to those of conventional receivers of the superheterodyne type and include an antenna system 10, 11, a radio-frequency amplifier 12 of one or more stages, a modulator 13, and an associated heterodyning oscillator 14. A unicontrol mechanism 38, shown in broken-line construction, permits simultaneous tuning adjustments to be accomplished in units 12 and 14 in well-known manner. An intermediate and audio-frequency amplifier 15 is coupled to modulator 13 and constitutes means for amplifying wave signals within a first or intermediate-frequency range and for amplifying wave signals within a second or audio-frequency range. It is preferable that modulator 13 be selected to provide an intermediate frequency which is exclusive of, and spaced from, the audio-frequency range, as in conventional superheterodyne procedure.

The design and construction of multiband or duplex amplifiers, such as amplifier 15, as well understood and the broad principles which govern their operation are well known. One such amplifier circuit is described in a United States Patent No. 2,201,365 to N. P. Case, granted May 21, 1940 and assigned to the same assignee as the present invention. While the duplex amplifier of the Case patent translates radio-frequency and intermediate-frequency signals, an arrangement of similar design may accommodate intermediate- and audio-frequency signals, as unit 15 of the instant application. It has been found, however, that amplifiers which amplify signals having two bands of frequencies are usually subject to a serious limitation called intermodulation. This is particularly true when the amplifier employs electron-discharge devices having anode current characteristics that are not linear over the operating range. The present amplifying means contemplates the use of electron-discharge devices having substantially linear anode current characteristics to minimize intermodulation.

The modulator 13 is connected to a first input circuit of unit 15, designated by terminals 16, and selectively adjusted for intermediate-frequency signals. Coupled to output terminals 17 of amplifier 15 is a frequency-selective amplitude-limiting means 18 for deleting any amplitude-modulation components from the intermediate-frequency signal. The output circuit of the limiter 18, in turn, is coupled to a unit 19 including a frequency converter for converting the components of intermediate-frequency signals to corresponding frequencies in the audio range, and also including an automatic volume control (A. V. C.) source. The frequency converter usually consists of a frequency discriminator and detector for demodulating the amplitude-limited intermediate-frequency signals to derive therefrom signal components included within the audio-frequency range and representing the desired modulation components of the received signal. The bias voltage developed by the A. V. C. source is applied by way of the connection 25 to one or more of the tubes in units 12, 13, 14, and 15, thereby maintaining the amplitude of the signal input to limiter 18 within a relatively narrow range for a wide range of received signal amplitudes.

The reflexing feature of the receiver, in accordance with this embodiment of the invention, is provided by means for feeding back the output signal of the discriminator and detector 19 to an input circuit of amplifier 15. To this end, a filter 20 connects the output circuit of the frequency converter 19 to a second input circuit of amplifier 15, designated by terminals 21 and selective to signals in the sound-frequency range. Preferably, the filter 20 is designed to transmit signals in the audio-frequency range and to suppress all others.

The output signal of the receiver is obtained from terminals 22 of amplifier 15 through a filter 23, which is similar to the above-mentioned filter 20. Filter 23 provides means for supplying this output signal to a utilizing device, such as a loud speaker 24.

In considering the operation of the circuit just described, it will be seen that it is similar to conventional superheterodyne receivers in that it employs the principles of heterodyning an intercepted radio-frequency signal to an intermediate-frequency signal and then detecting this signal to produce an audio-frequency signal. The operation of the radio-frequency amplifier 12, modulator 13, and oscillator 14 in deriving an intermediate-frequency signal from a received angular-velocity modulated carrier-wave signal is identical with the operation of corresponding units in a customary superheterodyne receiver.

The intermediate-frequency signal is applied to input terminals 16 of amplifier 15 where it is amplified and supplied through terminals 17 to limiter 18. Electronic-limiting devices included in unit 18 limit the amplitude of the intermediate-frequency signal to a definite and predetermined value to delete any spurious amplitude variations therefrom that may have been acquired during the process of transmission and amplification. The amplitude-limited intermediate-frequency signal is applied to a discriminator and detector 19 where its frequency or phase-modulation components are derived by conversion to corresponding amplitude-modulation signal components included within the audio-frequency range. The modulation components thus derived are reapplied to amplifier 15 through filter 20 for further amplification and thereafter are selected by filter 23 and supplied to utilizing device 24.

In general, an amplifier such as amplifier 15 which transmits two signals, each having separate frequency range, is susceptible to intermodulation, the most serious result being the effect of the audio-frequency signals upon the weaker intermediate-frequency signals. Because of this effect, the intermediate-frequency signals acquire spurious amplitude-modulation components which, when fed back through the reflex path to the amplifier input circuit, may have a tendency to cause oscillations. Even when oscillations do not result, the intermodulation action causes distortion and considerable background noise. The present invention does not prevent the intermodulation of one signal by another but by placing a limiter stage in cascade with amplifier 15 the undesired amplitude modulation of the intermediate-frequency signal is removed and the tendency to oscillate is minimized.

Fig. 2 illustrates a schematic circuit diagram of a tuned radio-frequency receiver and comprises, in cascade, an antenna system 26, 27, an amplifying means 28 for amplifying radio-frequency signals and audio-frequency signals, an amplitude limiter 29 and a discriminator, detector, and A. V. C. source 30. Reflex means are provided for applying the output signal of the detector 30 through a filter 31 to one set of input terminals 32 of the amplifier 28. The amplifier has one set of output terminals 33 which is frequently selective for radio-frequency signals. Another set of output terminals 34 is frequency selective for audio-frequency signals. Filters 31 and 35 are similar and pass only signals in the audio-frequency range. A utilizing device 36 which may be a loud-speaker is coupled to the output terminals of filter 35.

An A. V. C. bias, derived from unit 30 may be applied to any or all the electron-discharge devices in unit 28 by way of connection 37, thereby maintaining the amplitude of the signal input to limiter 29 within a relatively narrow range for a wide range of received signal amplitudes. In considering the operation of the circuit shown in Fig. 2, it will be seen that it is similar to conventional tuned radio-frequency receivers. The general operation of these components is identical with the operation of similar units in an ordinary tuned radio-frequency receiver.

An output signal of the amplifier 28 is taken from terminals 33, and includes only signals lying within the radio-frequency range, and is applied to the amplitude-limiting device 29 where spurious amplitude-modulation components are removed. The limited signal is thereafter applied to the discriminator and detector 30 where the frequency or phase-modulated wave signal is converted to a corresponding signal within the audio-frequency range.

The audio-frequency signal is applied through the filter 31 to the amplifier 28 by means of input terminals 32. After further amplification in unit 28, the modulation components are supplied from terminals 34 to a utilizing device 36 through filter 35.

The circuit shown in Fig. 2 is subject to the same operating conditions as the circuit in Fig. 1 except that the two frequency ranges, radio and audio, will in general, be spaced further apart than the audio- and intermediate-frequency ranges, and therefore, the separating circuits of Fig. 2 will be more efficient in their filtering action. The intermodulating action, however, will be the same in each case. The audio-frequency signals when transmitted through amplifier 28 will modulate the radio-frequency signals and tend to produce distortion and oscillation. The amplitude limiter 29 is employed to correct this defect in the same manner as in the circuit of Fig. 1.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A wave-signal receiver for translating modulated carrier-wave signals having desired angular-velocity modulation components included within a first range of frequencies comprising, means including at least one input circuit and at least one output circuit for amplifying wave signals within said first range and wave signals within a second frequency range exclusive of said first range, amplitude-limiting means coupled in cascade with and following said amplifying means for deleting amplitude modulation from wave signals within said first range, a frequency converter coupled in cascade with and following said amplitude-limiting means for converting the frequencies of said amplitude-limited wave signals within said first range to corresponding frequencies within said second range, means for feeding back the output signal of said frequency converter to an input circuit of said amplifying means, and means coupled to an output circuit of said amplifying means for supplying wave signals having frequencies within said second range to a utilizing device.

2. A wave-signal receiver for translating modulated carrier-wave signals having desired angular-velocity modulation components included within a first range of frequencies comprising, means including at least one input circuit and at least one output circuit for amplifying wave signals within said first range and wave signals within a second frequency range exclusive of said first range, frequency-selective amplitude-limiting means coupled to an output circuit of said amplifying means for deleting amplitude modulation from wave signals only within said first range, a frequency converter coupled in cascade with and following said amplitude-limiting means for converting the frequencies of said amplitude-limited wave signals within said first range to corresponding frequencies within said second range, means for feeding back the output signal of said frequency converter to an input circuit of said amplifying means, and means coupled to an output circuit of said amplifying means for supplying wave signals having frequencies within said second range to a utilizing device.

3. A wave-signal receiver for translating modulated carrier-wave signals having desired angular-velocity modulation components included within a first range of frequencies comprising, means including at least one input circuit and at least one output circuit for amplifying wave signals within said first range and wave signals within a second frequency range exclusive of said first range, amplitude-limiting means coupled in cascade with and following said amplifying means for deleting amplitude modulation from wave signals within said first range, a discriminator and wave-signal detector coupled in cascade with and following said amplitude-limiting means for demodulating said amplitude-limited wave signals within said first range to derive therefrom signal components included within said second range and representing said desired modulation components, means for feeding back the output signal of said discriminator and detector to an input circuit said amplifying means, and means coupled to an output circuit of said amplifying means for supplying said desired modulation components to a utilizing device.

4. A wave-signal receiver of the superheterodyne type for translating modulated carrier-wave signals having desired angular-velocity modulation components included within a first range of frequencies, an intermediate-frequency amplifier including at least one input circuit and at least one output circuit for amplifying wave signals having frequencies within said first range and wave signals having frequencies within a second frequency range exclusive of said first range, amplitude-limiting means coupled in cascade with and following said intermediate-frequency amplifier for deleting amplitude modulation from wave signals within said first range, a frequency converter coupled in cascade with and following said amplitude-limiting means for converting the frequencies of said amplitude-limited wave signals within said first range to corresponding frequencies within said second range, means for feeding back the output signal of said frequency converter to an input circuit of said intermediate-frequency amplifier, and means coupled to an output circuit of said intermediate-frequency amplifier for supplying wave signals having frequencies within said second range to a utilizing device.

5. A wave-signal receiver for translating received modulated carrier-wave signals having desired angular-velocity modulation components included within a first range of frequencies comprising, a radio-frequency amplifier including at least one input circuit and at least one output circuit for amplifying wave signals having frequencies within said first range and wave signals having frequencies within a second frequency range exclusive of said first range, amplitude-limiting means coupled in cascade with and following said radio-frequency amplifier for deleting amplitude modulation from wave signals within said first range, a frequency converter coupled in cascade with and following said amplitude-limiting means for converting the frequencies of said amplitude-limited wave signals within said first range to corresponding frequencies within said second range, means for feeding back the output signal of said frequency converter to an input circuit of said radio-frequency amplifier, and means coupled to an output circuit of said radio-frequency amplifier for supplying wave signals having frequencies within said second range to a utilizing device.

6. A wave-signal receiver for translating modulated carrier-wave signals having desired angular-velocity modulation components included within a first range of frequencies comprising, means including at least one input circuit and at least one output circuit for amplifying wave signals having frequencies within said first range and wave signals having frequencies within a second frequency range spaced from said first range, amplitude-limiting means coupled in cascade with and following said amplifying means for deleting amplitude modulation from wave signals within said first range, a frequency converter coupled in cascade with and following said amplitude-limiting means for converting the frequencies of said amplitude-limited wave signals within said first range to corresponding frequencies within said second range, means for feeding back the output signal of said frequency converter to an input circuit of said amplifying means, and means coupled to an output circuit of said amplifying means for supplying wave signals having frequencies within said second range to a utilizing device.

7. A wave-signal receiver for translating modulated carrier-wave signals having desired angular-velocity modulation components included within a first range of frequencies comprising, means including at least one input circuit and at least one output circuit for amplifying wave signals within said first range and wave signals within a second frequency range exclusive of said first range, amplitude-limiting means coupled in cascade with and following said amplifying means for deleting amplitude modulation from wave signals within said first range, a frequency converter coupled in cascade with and following said amplitude-limiting means for converting the frequencies of said amplitude-limited wave signals within said first range to corresponding frequencies within said second range, a frequency-selective feedback path for feeding back only wave signals within said second range from said frequency converter to an input circuit of said amplifying means, and means coupled to an output circuit of said amplifying means for supplying wave signals having frequencies within said second range to a utilizing device.

8. A wave-signal receiver for translating modulated carrier-wave signals having desired angular-velocity modulation components included within a first range of frequencies comprising, means including at least one input circuit and at least one output circuit for amplifying wave signals within said first range and wave signals within a second frequency range exclusive of said first range, amplitude-limiting means coupled in cascade with and following said amplifying means for deleting amplitude modulation from wave signals within said first range, a frequency converter coupled in cascade with and following said amplitude-limiting means for converting the frequencies of said amplitude-limited wave signals within said first range to corresponding frequencies within said second range, means for feeding back the output signal of said frequency converter to an input circuit of said amplifying means, and a frequency-selective output circuit for said amplifying means for supplying wave signals having frequencies within said second range to a utilizing device.

9. A wave-signal receiver for translating modulated carrier-wave signals having desired angular-velocity modulation components included within a first range of frequencies, said wave signals being subject to undesired amplitude modulation producing corresponding amplitude modulation signals within a second frequency range, comprising, means including at least one input circuit and at least one output circuit for amplifying said wave signals within said first range and signals within said second frequency range, a frequency-conversion system coupled to the output of said amplifying means and having substantial response to frequency deviations of amplified wave signals within said first range yet being substantially independent of said undesired amplitude modulation over at least a substantial portion of said second range for converting the frequencies of said amplified wave signals within said first range to corresponding frequencies within said second range, means for feeding back the output signal of said frequency-conversion system to an input circuit of said amplifying means, and means coupled to an output circuit of said amplifying means for supplying signals having frequencies within said second range to a utilizing device.

LUIS C. STENNING.

REFERENCES CITED

The following references are of record in the file of this patent:

UNITED STATES PATENTS

| Number | Name | Date |
|---|---|---|
| 2,006,969 | Steimel | July 2, 1935 |
| 2,251,397 | Case | Aug. 5, 1941 |
| 2,352,219 | Oleson | June 27, 1944 |
| 2,362,000 | Tunick | Nov. 7, 1944 |
| 2,379,694 | Edson | July 3, 1945 |